United States Patent [19]

Brooks

[11] 4,204,343
[45] May 27, 1980

[54] READING SKILLS DEVELOPMENT KIT

[76] Inventor: Cecilia H. Brooks, 215 W. 88th St., New York, N.Y. 10024

[21] Appl. No.: 616,594

[22] Filed: Sep. 25, 1975

[51] Int. Cl.² .............................................. G09B 1/06
[52] U.S. Cl. ........................................ 35/73; 35/35 H
[58] Field of Search .............. 35/35 H, 35 J, 73, 31 D

[56] References Cited

U.S. PATENT DOCUMENTS

| | | | |
|---|---|---|---|
| 1,055,151 | 3/1913 | Emerson | 35/35 H X |
| 1,280,930 | 10/1918 | Wolfe | 35/35 H |
| 1,506,156 | 8/1924 | Bjorklund | 35/35 H |
| 2,091,555 | 8/1937 | Messinger | 35/35 H |
| 2,581,595 | 1/1952 | Mioduski | 35/73 |
| 3,609,877 | 10/1971 | Weinstein | 35/35 H X |
| 3,678,602 | 7/1972 | Alam | 35/35 J |

Primary Examiner—Harland S. Skogquist
Attorney, Agent, or Firm—Kirschstein, Kirschstein, Ottinger & Cobrin

[57] ABSTRACT

A background has positioned thereon at least one permanent first phoneme set. Each of the first phoneme sets has associated therewith a deck of cards, each card in the deck bearing an interchangeable second phoneme set which, when combined with the associated first phoneme set creates a proper word. The cards are held adjacent the first phoneme sets by pockets on the background.

By changing the card in the pocket adjacent the first phoneme set different words are presented to the student in which the first phoneme set retains the same sound.

In one embodiment the permanent first phoneme sets form the terminal portion of a word and in another embodiment form the initial portion of a word.

Each of the pockets and their associated deck of cards may be of the same color but different from every other pocket and card deck so that if the student places a card in a pocket not having the same color, the student will know that the word formed is not a proper word.

5 Claims, 13 Drawing Figures

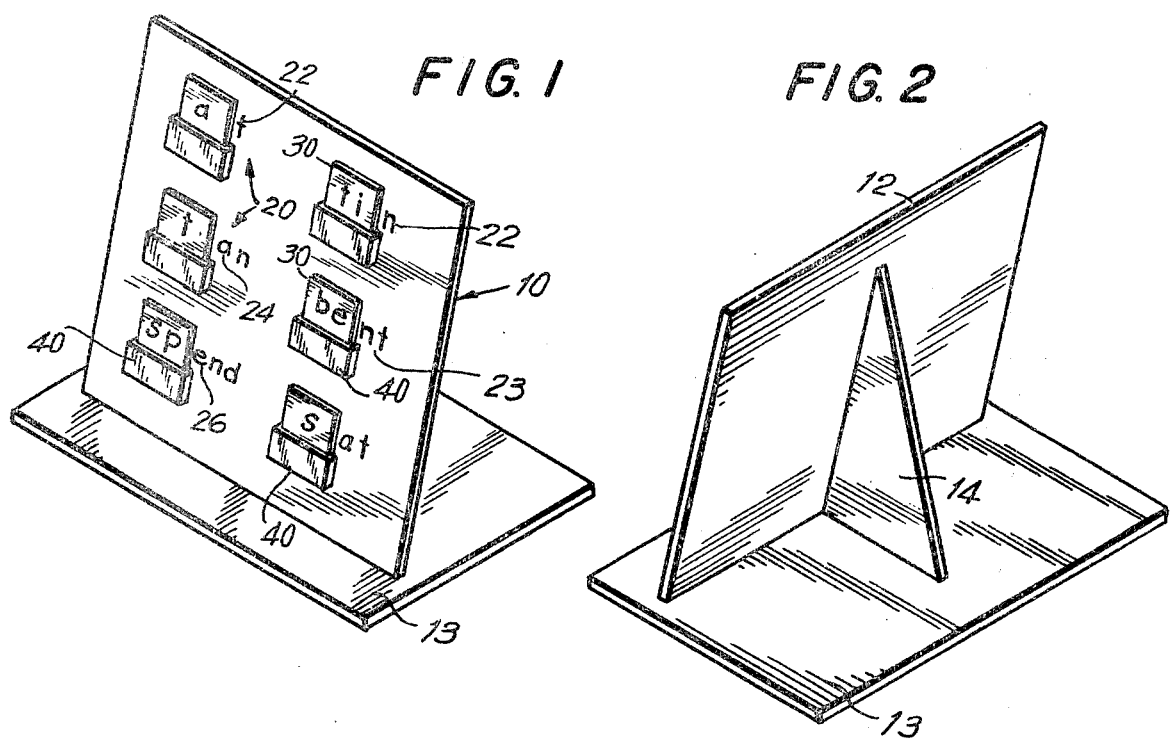
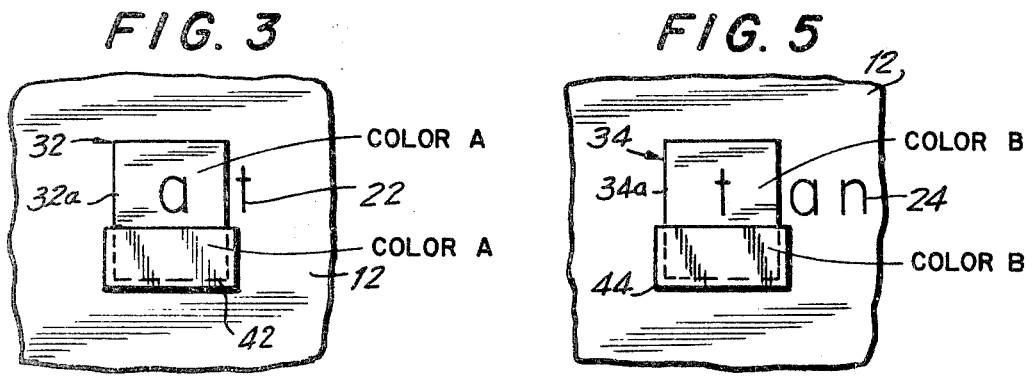
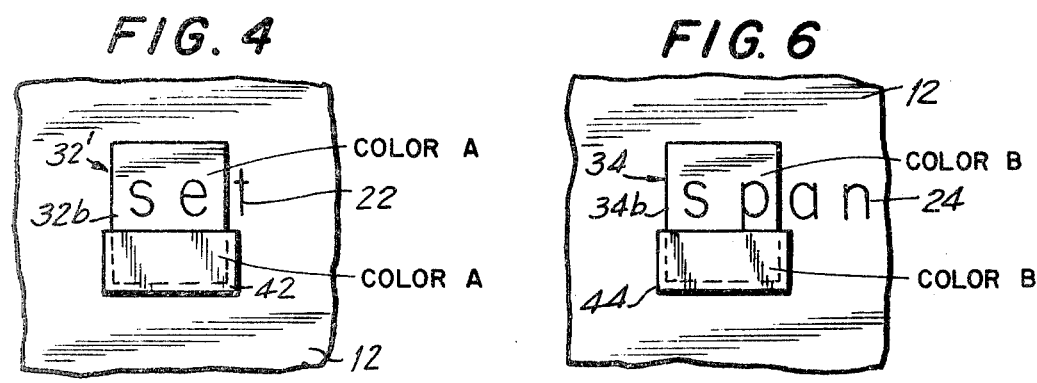

READING SKILLS DEVELOPMENT KIT

BACKGROUND OF THE INVENTION

1. Field of the Invention

The invention relates to a reading aid and more particularly to a reading skills development kit useful in developing a student's reading skills through phonics.

2. Prior Art

It has been long understood in the educational community that an individual's success depends in a large part of his ability to read.

There are at least two basic accepted methods of teaching reading. One method is the sight method whereby a student memorizes each word individually so that when he encounters the word while reading, he recognizes it. If he has never encountered the word before he usually will have difficulty since the sight method does not teach rules for breaking words into basic sounds. The other method is the use of phonics. Phonics teaches the student the sound of the letters or groups of letters in the word. The student then develops an ability to decode words, i.e. break them down into the basic sounds made by letters so that he can pronounce them correctly when he encounters them for the first time.

Many teaching aids are available to the instructor to teach the phonics method. However, there are very few simple, self-teaching methods and this can present a problem. The student is not able to learn on his own at home but must have someone, who can read, assist him.

It is toward elimination of these and other problems that the present invention is directed.

SUMMARY OF THE INVENTION

1. Purposes of the Invention

It is an object of the present invention to provide a reading skills development kit for developing the reading skills of a student by teaching the student the sounds associated with certain letters or groups of letters.

Another object of the present invention is to provide a reading skills development kit wherein the student is exposed to a series of different words wherein a portion of the word retains the same sound to thereby reinforce his understanding of the sounds associated with different letter combinations.

A further object of the present invention is to provide a reading skills development kit which can be used as a diagnostic tool to determine in which area of phonics the student is having difficulty.

Yet another object of the present invention is to provide a reading skills development kit wherein the student is challenged to make additional words and then to read those words thereby improving his reading skills.

A still further object of the present invention is to provide a reading skills development kit in which the student is reinforcing his basic reading skills while enjoying the success of making new words.

Yet another object of the present invention is to provide a reading skills development kit wherein the student may correct his own work.

Other objects of the present invention in part will be obvious and in part will be apparent in the following description.

2. Brief Description of the Invention

Generally speaking, a reading skills development kit in accordance with the present invention has a background or plaque having at least one permanent first phoneme set thereon. Associated with each phoneme set is a deck of cards, each card having a different interchangeable second phoneme set on a face thereof. Each phoneme set may be a consonant, a group of consonants, a vowel, a group of vowels, or one or more consonants and one or more vowels. The cards are placed in a pocket adjacent to the first phoneme set on the background. In this position, the front cart has the second phoneme set exposed. The second phoneme set on each of the cards in the deck when sounded with the first phoneme set on the background forms a proper word. In each of the different words in the first phoneme set retains the same sound. In this manner the student can create different words by changing the cards and by so doing reinforces his understanding of the sound associated with a certain phoneme set.

The permanent first phoneme sets on the background may form the initial portion of a word or may form the terminal portion of a word. In either case the interchangeable second phoneme sets imprinted on the cards complete the word.

A color coding system makes the reading skills development kit self-correcting. Each deck of cards has a color associated therewith. Each of the first phoneme sets has a color associated therewith, preferably appearing on the pocket. If a student places a card of one color adjacent a phoneme set in a pocket the same color he can be sure he has created a bona fide word; if he places a card of one color adjacent a phoneme set of a different color, he is not assured of a bona fide word.

The invention consists in the features of construction, and arrangement of parts which will be detailed hereinafter and described in the appended claims.

BRIEF DESCRIPTION OF THE DRAWINGS

For a better understanding of the present invention reference should be had to the accompanying drawings wherein like numerals of reference indicate similar parts throughout the several views and wherein:

FIG. 1 is a front view of a reading skills development kit in accordance with the present invention;

FIG. 2 is a rear perspective view of the kit illustrated in FIG. 1;

FIGS. 3 and 4 are enlarged front views of portions of the kit illustrated in FIG. 1 showing the formation of different words by changing the cards in the pocket adjacent a first phoneme set;

FIGS. 5 and 6 are views similar to FIGS. 3 and 4 but of another portion of the background;

DESCRIPTION OF THE PREFERRED EMBODIMENT

Figure 7:
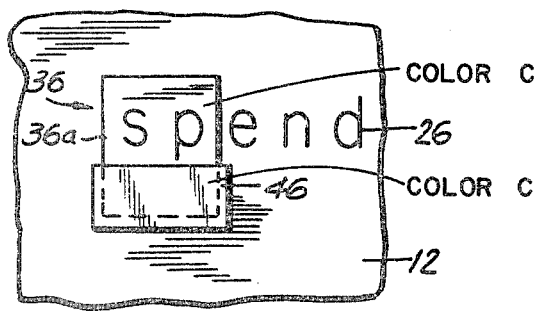
FIGS. 7 and 8 are views similar to FIGS. 3 and 4 but of still another portion of the background.

Referring now to the drawings, a reading skills development kit in accordance with one embodiment of the present invention is illustrated in FIGS. 1 through 8 and is identified generally by the reference numeral 10. The kit includes a plaque or background 12 which is formed from an inexpensive rigid light-weight material such as cardboard so that the kit may be easily transported or set up by a child. The background 12 may have associated therewith means to support the background 12 in an erect position on a horizontal surface 13, such as an easel-like structure 14 shown in FIG. 2. Alternatively, loops or hooks (not shown) may be secured to the back surface of the background to hand it on a vertical surface such as the wall of a classroom or children's rooms. It will be appreciated that other types of support means may be provided and these support means do not form a part of the present invention.

In the specification and the claims the term "phoneme" is used as and connotes "the smallest contrastive unit in the sound system of a language functioning to distinguish utterances from one another". (Funk and Wagnalls' *Standard College Dictionary*, copyrighted 1973.) Phonemes are not separate sounds and cannot be pronounced in isolation. A "phoneme set", as used herein, is defined as a portion of a word consisting of at least one phoneme and may consist of one or more consonants, one or more vowels or a combination of consonants and vowels.

There is illustrated in FIG. 1 a series of permanent first phoneme sets 20 permanently positioned on the background 12. The first phoneme sets may be imprinted on the background for permanence. In this embodiment each first phoneme set 20 constitutes the terminal portion of a word. As shown in FIG. 1, the series of first phoneme sets 20 may include a phoneme set of 22 constituted of only one consonant, a phoneme set 23 of two consonants, a phoneme set 24 of a consonant and a vowel, and a phoneme set 26 of a vowel and two consonants. It is to be appreciated that while the reading skills development kit 10 is illustrated as having four different types of first phoneme sets thereon, it may have first phoneme sets of all the same type, e.g., every phoneme set in the first phoneme set 20 may consist of only one consonant, or only a consonant and a vowel, or only a vowel and two consonants, etc., so as not to confuse a student who is just beginning to read by exposing him to relatively complicated words having more than two or three letters. The phoneme set is provided as by printing.

Associated with every one of the first phoneme sets 20 is a different deck of cards 30 forming a different group of interchangeable second phoneme sets which is held in an open-topped pocket 40 permanently mounted on the background 12. Each of the cards in each of the decks 30 bears a second phoneme set, formed as by printing, which, when positioned adjacent its associated phoneme set 20 forms an intelligible word. The pockets are so located and the second phoneme sets so placed on the cards that the first and second phoneme sets are adjacent each other and on the same line.

For example, in FIGS. 3 and 4 there is illustrated a portion of the background 12 bearing the first phoneme set 22 consisting of the letter "t". A deck of cards 32 is provided and each card in the deck, as mentioned above, bears a second phoneme set thereon. Card 32a bears the second phoneme set "a" and when placed at the front of deck 32 in the pocket 42 before the first phoneme set 22 conjointly forms the word "at". The student pronounces the word "at", recognizing the sounds associated with the "a" and the "t" and blending the separate sounds to vocally enunciate the complete word. And the card (not shown) in the deck 32 may bear the second phoneme set "i" which, with the first phoneme set "t" forms the word "it". In each example the "t" is sounded the same. The student, by changing the cards and forming different words, can thus develop the ability to blend the initial vowel sound with the terminal consonant sound of the letter "t".

In FIG. 4 another card 32b of a different deck 32' bearing the second phoneme set "se" is placed at the front of the deck 32' in the pocket 42 before the first phoneme set 22 to form the word "set". In this case, the student must blend the initial consonant sound of "s" with the vowel sound "e" and then blend that sound with the terminal consonant sound of "t". Another card, not shown, in the deck 32' may bear the phoneme set "ne" which forms the word "net" with the first phoneme set 22. Thus, the student is given an introduction to and reinforcement of blending two or three sounds to form a word. The cards in the deck 32' may bear similar phonemes constituting the combination of an initial single consonant and the same following single vowel, e.g. "be", "ge", "je", "le", "me", "pe" and "we". Another deck 32' has various single initial consonants and the same following different vowel, e.g. "ba", "ca", "fa" etc. More decks are used having for the first phoneme set various single initial consonants and other single but different vowels. Thus for one other deck the single vowel is "i" and typical consonants are: b, f, h, etc. For another deck the vowel is "o" and typical consonants are: c, d, g, etc. For still another deck the vowel is "u" and typical consonants are: b, c, h, etc.

FIGS. 5 and 6 illustrate another portion of background 12 containing first phoneme set 24 consisting of the "an" sound combination, thus being illustrative of a terminal phoneme set comprised of a single vowel followed by a single consonant. Other such sets can be "ab", "ad", "ag", etc., and like sets with different initial single vowels. Card 34a in deck 34 positioned in pocket 44 bears the second phoneme set "t" (a single consonant) which, when combined with the phoneme set 24 creates the word "tan". Similarly, card 34b, contains the phoneme set "sp" to create the word "span" when combined with phoneme set 34. The student is taught to blend the initial consonants and then blend them with the terminal combination of the vowel and consonant to sound the word. In each example the student is exposed to a terminal combination of a vowel and a consonant that retains the same sound even though the initial portion of the word varies.

Figure 8:
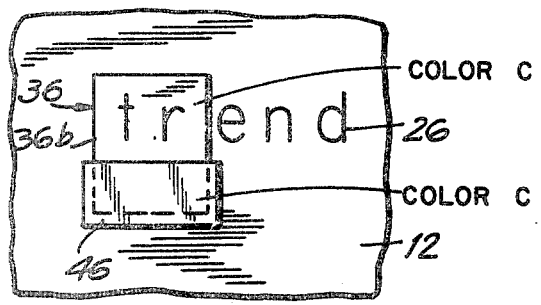

In FIGS. 7 and 8 there is illustrated a third possible first phoneme set which is the phoneme set 26 consisting of the letters "end" having a deck 36 positioned in pocket 46 associated therewith. Front card 36a bears the phoneme set "sp" which forms the word "spend" with phoneme set 26. Card 36b of the deck 36 bears the phoneme set "tr" to form the word "trend". The student must now pronounce the initial consonant combination and blend that with the terminal phoneme set consisting of a vowel and two consonants.

The student, by beginning with the two phoneme sets combined to form the word "at" and progressing through more complex phoneme sets used in combination learns sounds and blends which he can employ to break down more complicated words which he may encounter during his reading experiences.

While the above discussion referred to a reading skills development wherein the terminal portion of each word remained the same, in an alternative embodiment illustrated in FIGS. 9 through 13 the initial portion of the word remains constant and the terminal portion is varied.

It has been found that students have a tendency to break the words formed in the first embodiment discussed into the proper sounds but have difficulty in blending the separate sounds into a complete word. In the alternative embodiment, however, the students have no difficulty in blending the separate sounds into the word.

Figure 9:
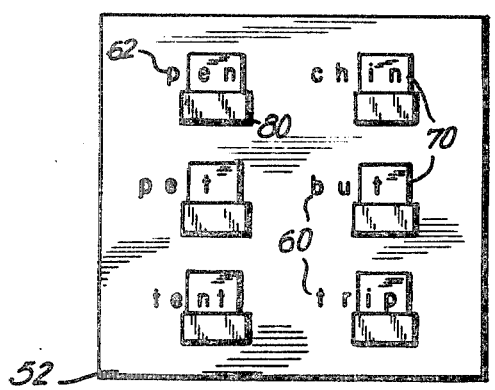
FIG. 9 is a front view of an alternative embodiment of the present invention.

FIG. 9 illustrates the background 52 having permanent first phoneme sets 60 thereon each forming the initial portion of a word. Associated therewith is a deck of interchangeable second phoneme sets. Each first phoneme set 60 may consist of one or more consonants, a vowel or combinations of one or more consonants and one or more vowels. A series of pockets 80 which are permanently mounted on the background 52 hold decks of cards 70 which create series of second phoneme sets hereinbelow described adjacent their associated first phoneme sets 60. The two sets are selected to form intelligible words.

Figure 10:
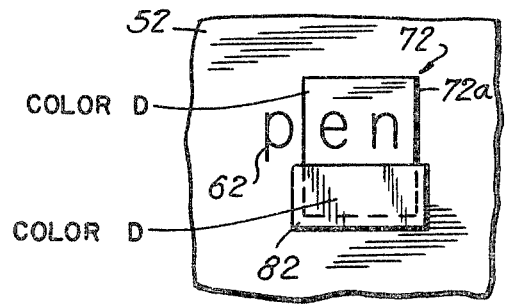
FIGS. 10 and 11 are enlarged front views of portions of the kit illustrated in FIG. 9 showing the formation of different words by changing the cards in the pocket adjacent a first phoneme set.
Figure 11:
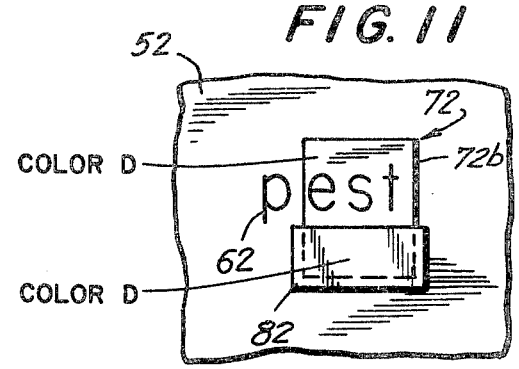
Figure 12:
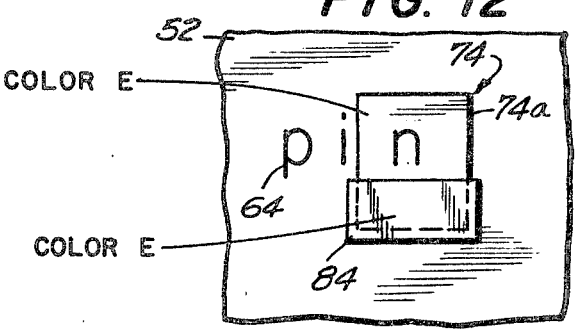
FIGS. 12 and 13 are views similar to FIGS. 10 and 11 but of another portion of the background.

As shown in FIGS. 10 and 11, the first phoneme set 62 "p" has associated therewith a deck of cards 72 held in pocket 82 each bearing a second phoneme set which when sounded with the phoneme set 62 forms an intelligible word. In FIG. 10, the second phoneme set on front card 72a consists of the phoneme set "en" which with the permanent first phoneme set forms the word "pen". FIG. 12 shows the word "pest" formed when the card 72b bearing the second phoneme set "est" is placed after the first phoneme set 62. As the student changes the cards in the pocket to make new words, he is required to blend the sound made by the phoneme set 62 with the sound made by the terminal phoneme set, which, in itself, is a phonic blend.

Figure 13:
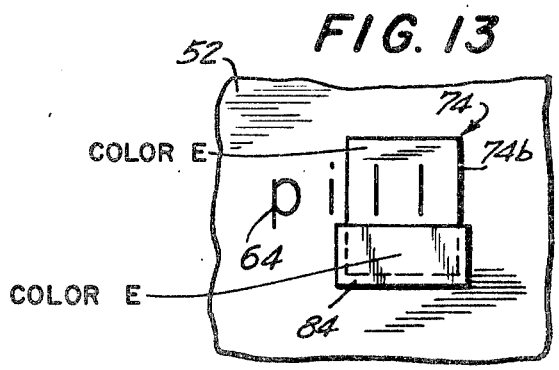

As mentioned hereinabove the permanent first phoneme sets 60 may contain more than just one consonant. There is shown in FIGS. 12 and 13 the phoneme set 64 consisting of "pi" having a deck of cards 74 associated therewith. The card 74a bears the interchangeable second phoneme set "n" to form the word "pin", In FIG. 13, the card 74b bearing the interchangeable second phoneme set "ll" forms the word "pill". The student will learn the sound associated with the permanent first phoneme set "pi" and further, how to blend that sound with various ending combinations.

It will be appreciated that the specific phoneme sets set forth hereinabove are for illustration only and should not be viewed in a limiting sense. There are in the English language a multiplicity of words in which a portion of each word sounds the same and which can be readily substituted for the combinations illustrated hereinabove.

The reading skill development kit in accordance with the present invention can serve as a diagnostic tool to help detect and evaluate the student's reading problems. By the instructor exposing the student to several of the phoneme set combinations appearing on the background the instructor can detect if the student is having difficulty with a particular phonics concept, for example the blend of an initial consonant with a terminal blend, or the blending of an initial consonant combination with a terminal vowel and consonant combination. Once the problem is identified, the student can be given instruction and reinforcement in that particular area to overcome the problem.

One of the advantages of the present invention is the provision of a reading skills development kit in which the student can create new words and learn to pronounce them without assistance from instructors.

In each of the embodiments described hereinabove in detail a self correcting code means may be provided so that a child, working on his own will know when he has created an improper word.

As mentioned hereinabove, each of the permanent first phoneme sets 20 or 60 has a separate deck of cards 30 or 70 respectively bearing interchangeable second phoneme sets associated therewith. The decks of cards 30 or 70 are held in pockets 40 or 80 adjacent the permanent phoneme sets. The pocket associated with each phoneme set is made a different color. All of the cards in a particular deck of cards 30 or 70 are the same color as the pocket in which they are held. In this manner, if the student places a card of one color in a pocket of a different color, he will know that the word formed may not be a proper word. When he places a card bearing the interchangeable second phoneme sets in the matching colored pocket he will never form a non-existant word.

It can be seen from the foregoing detailed description that the object of the present invention, namely to create a reading skills development kit has been achieved by providing a background having at least one permanent first phoneme set thereon. Associated with each of the first phoneme sets is a deck of cards in a pocket adjacent the first phoneme set, each card in the deck bearing an interchangeable second phoneme set. When the first and second phoneme sets are combined a proper word is formed. As the student puts different cards in the deck adjacent the first phoneme set different words are formed, but in each word the first phoneme set retains the same sound. The student learns which sound is associated with a particular letter grouping.

The first phoneme set can form the initial portion of a word or the terminal portion.

Each pocket and its associated deck of cards are of the same color, different from every other pocket and deck so that a student will know that a word formed with a card of a color different than the pocket is an improper word. Coding means other than the color of a pocket can be employed to distinguish between interchangeable second phoneme sets. For example, the first phoneme set can be of a color or set against a colored background, the color being that of the cards of the associated second phoneme set. Alternatively, a distinguish mark, e.g. a letter, or number or symbol can be placed on all cards of a given second phoneme set and the same mark associated with the corresponding pocket or first phoneme set.

While in accordance with the patent statutes, a preferred embodiment of the present invention has been illustrated, and described in detail it is to be particularly understood that the invention is not limited thereto or thereby.

What is claimed is:

1. A reading skills development kit comprising:
 (a) a background;
 (b) at least one permanent first phoneme set fixedly disposed on said background, being at least one phoneme and forming a portion of a word;
 (c) a different series of elements providing interchangeable second phoneme sets associated with each of said at least one first phoneme sets, each second phoneme set being at least one phoneme and forming an intelligible word with said at least one first phoneme set;

(d) means on said background for selectively exposing said second phoneme sets, one at a time, adjacent their associated at least one first phoneme set to create different intelligible words that include said at least one first phoneme set;

(e) said at least one first phoneme set having the same sound in each of said words so formed; and (f) coding means associated with said first and second phoneme sets to identify that series of interchangeable second phoneme sets singularly associated with said at least one permanent first phoneme set to indicate erroneous association of a particular interchangeable second phoneme set with a particular at least one permanent first phoneme set.

2. A reading skills development kit in accordance with claim 1 wherein each of said at least one permanent first phoneme sets forms the terminal portion of a word and each of said interchangeable second phoneme sets forms the initial portion of a word.

3. A reading skills development kit in accordance with claim 1 wherein each of said at least one permanent first phoneme sets forms the initial portion of a word, and each of said interchangeable second phoneme sets forms the terminal portion of a word.

4. A reading skills development kit in accordance with claim 1 including a separate deck of cards associated with each of said at least one permanent first phoneme sets, each card in said deck bearing a different one of said interchangeable second phoneme sets and wherein said exposing means comprises a pocket adapted to receive said deck of cards on said background with the interchangeable second phoneme sets located above the pocket.

5. A reading skills development kit in accordance with claim 4 wherein each of said pockets is a different color and each of said cards in said deck inserted in said pocket is the same color as said pocket so that a student will know he has not formed a proper word with said at least one first and second phoneme sets if said color of said cards does not match said color of said pocket.

* * * * *